(12) United States Patent
Vedurmudi et al.

(10) Patent No.: US 8,509,863 B2
(45) Date of Patent: Aug. 13, 2013

(54) EXPANDABLE HOUSING OF A MOBILE COMMUNICATION DEVICE

(75) Inventors: Sriharsha Vedurmudi, Andhra Pradesh (IN); Deepesh Gujaruthi, Andhra Pradesh (IN)

(73) Assignee: Nvidia Corporation, Santa Clara, CA (US)

( * ) Notice: Subject to any disclaimer, the term of this patent is extended or adjusted under 35 U.S.C. 154(b) by 434 days.

(21) Appl. No.: 12/334,557

(22) Filed: Dec. 15, 2008

(65) Prior Publication Data

US 2010/0151925 A1    Jun. 17, 2010

(51) Int. Cl.
*H04M 1/00* (2006.01)
*H04B 1/38* (2006.01)

(52) U.S. Cl.
USPC ........................................ 455/575.1; 455/557

(58) Field of Classification Search
USPC ............. 455/575.1, 574.4, 574.8, 556.1, 557, 455/558, 559, 575.2, 575.4, 575.6, 575.9; 345/156, 184, 204, 205; 379/428.01, 428.04, 379/430, 431, 433.01, 433.1, 433.11, 440
See application file for complete search history.

(56) References Cited

U.S. PATENT DOCUMENTS

| | | | |
|---|---|---|---|
| 7,499,282 B1 * | 3/2009 | Loucks | 361/730 |
| 7,970,126 B2 * | 6/2011 | Ahn et al. | 379/428.03 |
| 2004/0259587 A1 * | 12/2004 | Chadha | 455/550.1 |
| 2005/0070324 A1 * | 3/2005 | Chadha | 455/550.1 |
| 2008/0096619 A1 * | 4/2008 | Kuga et al. | 455/575.4 |
| 2009/0172241 A1 * | 7/2009 | Chen | 710/313 |

* cited by examiner

*Primary Examiner* — George Eng
*Assistant Examiner* — Hung Du
(74) *Attorney, Agent, or Firm* — Raj Abhyanker, P.C.

(57) ABSTRACT

A method, system and apparatus for expandable housing of a mobile communication device are disclosed. A housing of a mobile communication device includes a base layer, at least one of a component layer coupled communicatively on either side of the base layer to enable modification of a modular peripheral component integrated into the housing by sliding the modular peripheral component through a set of grooves located on opposite sides of each of the component layer and the base layer and a holding mechanism in the component layer that enables the modular peripheral component to remain in a fixed position. The modular peripheral component includes a daisy-chainable expansion port that enables an additional modular peripheral component integratable in the mobile communication device to be communicatively coupled with the housing across a variety of physical connections of the daisy-chainable expansion port.

17 Claims, 10 Drawing Sheets

FRONT VIEW OF A HOUSING OF A MOBILE COMMUNICATION DEVICE WHEN A MODULAR PERIPHERAL DEVICE IS ADDED 650

EXPANDABLE HOUSING OF A MOBILE COMMUNICATION DEVICE

FIELD OF TECHNOLOGY

This disclosure relates generally to mobile technology and more particularly to an expandable housing of a mobile communication device.

BACKGROUND

A manufacturer may design a housing of a mobile communication device. The housing of the mobile communication device may be a structure and/or a body where a peripheral component such as a keypad, a display screen, etc. are mounted to build the mobile communication device structurally. The manufacturer may market (e.g., sell, lease, etc.) the mobile communication device with the peripheral component built-into the housing in a form of a package. The package may be designed such that it restricts a buyer with limited options to add, remove, and/or upgrade the components built into the housing in the form of the package. For example, typically, a built in camera, a touch-screen display, and/or a keypad may be pre-configured at the time of manufacture. As a result, the manufacturer may lose potential revenue opportunities because of limited customization options of the mobile communication device by the user.

SUMMARY

A method, system and apparatus for expandable housing of a mobile communication device are disclosed. In one aspect, a housing of a mobile communication device includes a base layer, at least one of a component layer coupled communicatively on either side of the base layer to enable modification of a modular peripheral component integrated into the housing by sliding the modular peripheral component through a set of grooves located on opposite sides of each of the component layer and the base layer and a holding mechanism in the component layer that enables the modular peripheral component to remain in a fixed position. The modular peripheral component includes a daisy-chainable expansion port that enables an additional modular peripheral component which can be integrated in the mobile communication device so as to be communicatively coupled with the housing across a variety of physical connections of the daisy-chainable expansion port.

The housing may include a rotating mechanism between the component layer and the base layer at one end of the housing such that the component layer can be rotated in either direction with a center of axis being a fixed end of the base layer and the component layer such that the component layer of the housing to enable placement of a performance enhancing graphic processor component to the base layer. In addition, the housing may include a communication port in the component layer that enables the modular peripheral component to communicate with the base layer. The housing may also include a shutter to cover a remaining empty space and to mask the modular peripheral component in the component layer. The component layer may be designed as a First In Last Out (FILO) shelf structure to secure the modular peripheral component such that the modular peripheral component is integratable and securable in the FILO shelf structure.

The housing may include movement layout in the groove such that the modular peripheral component is securable into the movement layout. The movement layout in the groove may be a designed space in the component layer to enable movement of the modular peripheral component in the housing of the mobile communication device. The holding mechanism may lock the modular peripheral component and may integrate the modular peripheral component with the component layer in the housing of the mobile communication device.

The modification of the modular peripheral component integrated into the housing may be an addition of the modular peripheral component, removal of the modular peripheral component and/or enhancement of an existing modular peripheral component by replacing the existing modular peripheral component with an enhanced version of a modular peripheral component. The modular peripheral component may be an input device such as an interchangeable set of cameras that offer capture of still and motion video across a variety of resolution types. The modular peripheral component is an interchangeable touch screen to function as an interface between a processor of the mobile communication device and an external environment by displaying information at varying resolution and color depths and/or performing a function of a pointing device such a single click function, a double click function and a drag and drop function.

The modular peripheral component may be an interchangeable speaker that generates a range of volume for an audio signal with different audible effect to be heard at different threshold distances. The modular peripheral component may be a keypad that serves as an interface between the mobile communication device and an external environment so as to configure and manage the mobile communication device. The modular peripheral component may be a performance enhancing graphic processor component such as a secondary processor performing graphics acceleration attachable in the base layer that provides performance enhancement of the mobile communication device.

In another aspect, a method of integrating an expandable housing of a mobile communication device includes coupling communicatively a component layer on either side of a base layer to enable modification of a modular peripheral component integrated into the housing by sliding the modular peripheral component through a set of grooves located on opposite sides of the component layer, securing the modular peripheral component in a fixed position and enabling the modular peripheral component to communicate with the base layer through the component layer. The modular peripheral component includes a daisy-chainable expansion port that enables an additional modular peripheral component integratable in the mobile communication device to be communicatively coupled with the housing across a variety of physical connections of the daisy-chainable expansion port.

The method may include providing a rotating mechanism between the component layer and the base layer at one end of the housing such that the component layer can be rotated in either directions with a center of axis being a fixed end of the base layer and the component layer enabling an addition of a enhancing modular peripheral component to be added to the base layer. The method may also include designing a movement layout in the groove of the component layer to enable movement of the modular peripheral component in the housing of the mobile communication device. In addition, the method may include designing a shutter to cover a remaining empty space between the modular peripheral component and a locking mechanism at an end of the component layer and to mask the modular peripheral component in the component layer.

The method may also include designing the component layer as a First In Last Out (FILO) shelf structure to secure the modular peripheral component such that the modular peripheral component is integratable and securable in the FILO shelf structure. The modification of the modular peripheral component integrated into the housing may be an addition of the modular peripheral component, removal of the modular peripheral component and/or enhancement of an existing modular peripheral component by replacing the existing modular peripheral component with an enhanced version of a modular peripheral component.

The modular peripheral component may be an input device such as an interchangeable set of cameras that offer capture of still and motion video across a variety of resolution types. In addition, the modular peripheral component may also include an input/output device such as an interchangeable touch screen to function as an interface between a processor of the mobile communication device and an external environment by displaying information at varying resolution and color depths and performing a function of a pointing device such a single click function, a double click function and a drag and drop function. The method may also include an output device such as an interchangeable speaker that generates a range of volume for an audio signal with different audible effect to be heard at different threshold distances. The method may include a controlling device such as a keypad that serves as an interface between the mobile communication device and an external environment so as to configure and manage the mobile communication device. The method may yet include a performance enhancing modular peripheral component such as a secondary processor performing graphics acceleration attachable in the base layer that provides performance enhancement of the mobile communication device.

In yet another aspect, a mobile communication device includes a housing of the mobile communication device to include a base layer and at least one of a component layer to enable expansion of capabilities of the mobile communication device by modification of a modular peripheral component, a processing component in the base layer to detect the modification of the modular peripheral component and to process signals of the mobile communication device, a communication component in the mobile communication device to enable communication between a processor of the mobile communication device and the modular peripheral component of the mobile communication device, a power source component in the mobile communication device to power the mobile communication device and an external communication component to enable communication between the mobile communication device and an external environment.

The modification of the modular peripheral component integrated into the housing may be an addition of the modular peripheral component, removal of the modular peripheral component and/or enhancement of an existing modular peripheral component by replacing the existing modular peripheral component with an enhanced version of a modular peripheral component. The modular peripheral component may be an input device such as camera, a keypad and/or a barcode reader, a communication device such as a bluetooth device, a GSM device, a CDMA device, a GPS device and an Infrared device, an output device such as a speaker and a display device, and a processing device such as secondary processor for graphic acceleration.

Other aspects and example embodiments are provided in the Drawings and the Detailed Description that follows.

BRIEF DESCRIPTION OF THE VIEWS OF DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

A method, system and apparatus for expandable housing of a mobile communication device are disclosed. Although the present embodiments have been described with reference to specific example embodiments, it will be evident that various modifications and changes may be made to these embodiments without departing from the broader spirit and scope of the various embodiments.

Figure 4:
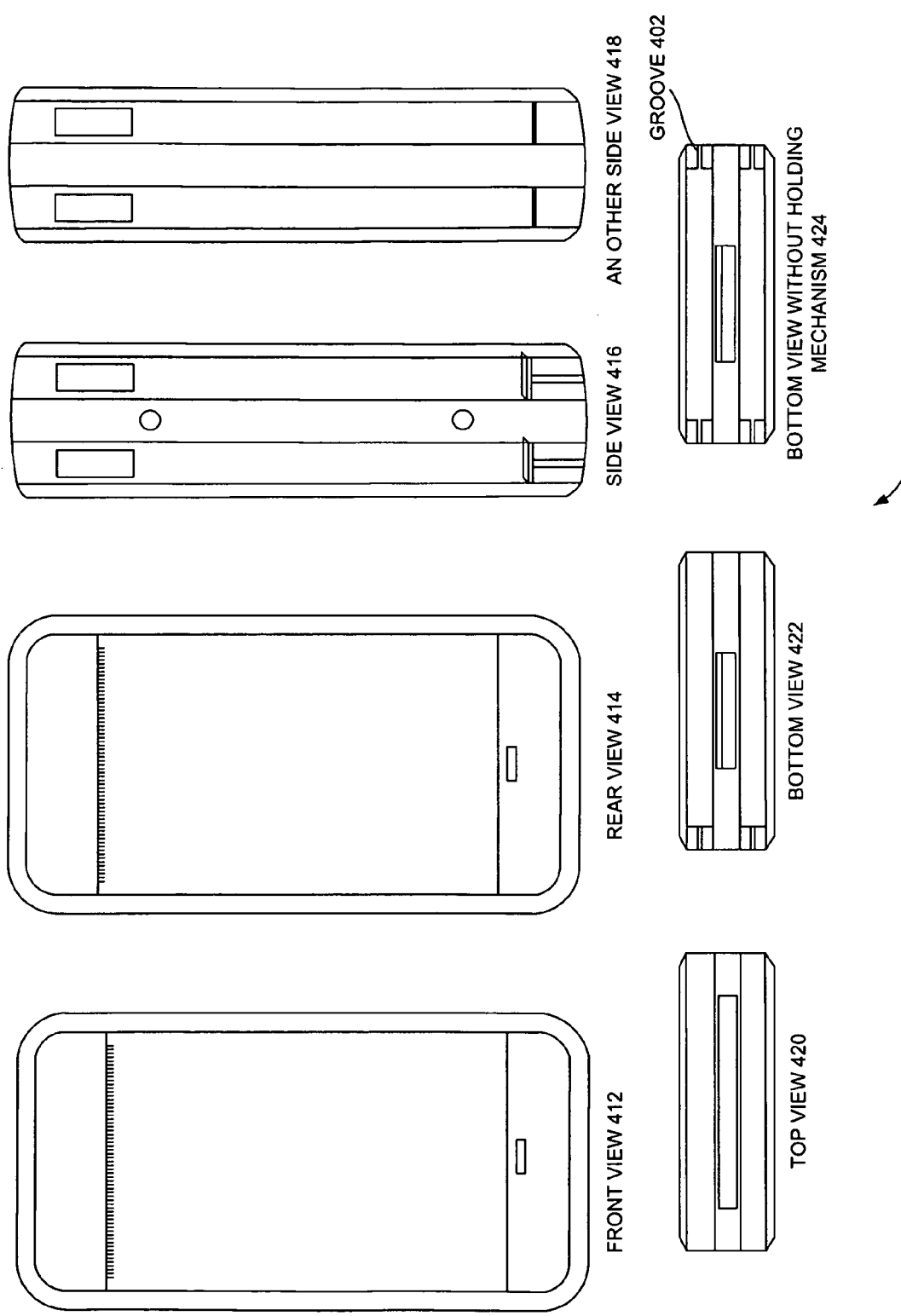
FIG. 4 is a schematic view illustrating different views of the housing of the mobile communication device, according to one embodiment.
Figure 8:
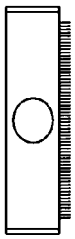
FIG. 8 is table view illustrating a list of the modular peripheral components for the housing of the mobile communication device, according to one embodiment according to one embodiment.

In one aspect, a housing of a mobile communication device (e.g., the housing of a mobile communication device 150 of FIG. 1) includes a base layer (e.g., the base layer 102 of FIG. 1), component layers (e.g., the component layer 100A-B of FIG. 1) coupled communicatively on either side of the base layer 102 to enable modification of a modular peripheral component (e.g., any of the modular peripheral component illustrated in FIG. 8) integrated into the housing by sliding the modular peripheral component through a set of grooves (e.g., the grooves 402 as illustrated in FIG. 4) located on a side of each of the component layer 100A-B and a holding mechanism (e.g., the holding mechanism 114 of FIG. 1) in the component layer 100A-B that enables the modular peripheral component to remain in a fixed position. The modular peripheral component includes a daisy-chainable expansion port (e.g., the daisy-chainable expansion port 604A-B of FIG. 6A-B) that enables an additional modular peripheral component integratable in the mobile communication device to be communicatively coupled with the housing across a variety of physical connections of the daisy-chainable expansion port.

In another aspect, a method of integrating an expandable housing of a mobile communication device includes coupling communicatively a component layer (e.g., the component layer 100A-B of FIG. 1) on either side of a base layer (e.g., the base layer 102 of FIG. 1) to enable modification of a modular peripheral component (e.g., any of the modular peripheral component illustrated in FIG. 8) integrated into the housing by sliding the modular peripheral component through a set of grooves (e.g., the grooves 402 as illustrated in FIG. 4) located on sides of the component layer 100A-B, securing the modular peripheral component in a fixed position and enabling the modular peripheral component to communicate with the base layer 102 through the component layer 100A-B. The modular peripheral component includes a daisy-chainable expansion port that enables an additional modular peripheral component integratable in the mobile communication device to be communicatively coupled with the housing across a variety of physical connections of the daisy-chainable expansion port.

In yet another aspect, a mobile communication device includes a housing of the mobile communication device (e.g., the housing of a mobile communication device 150 of FIG. 1) to include a base layer (e.g., the base layer 102 of FIG. 1) and at least one of a component layer (e.g., the component layer 100A-B of FIG. 1) to enable expansion of capabilities of the mobile communication device by modification of a modular peripheral component (e.g., any of the modular peripheral component illustrated in FIG. 8), a processing component (e.g., the processing component 208 of FIG. 2) in the base layer 102 to detect the modification of the modular peripheral component and to process signals of the mobile communication device, a communication port (e.g., the communication port 104 of FIG. 1) in the mobile communication device to enable communication between the processing component 208 of the mobile communication device and the modular peripheral component of the mobile communication device, a power source component (e.g., the power source 206 of FIG. 2) in the mobile communication device to power the mobile communication device and an external communication component (e.g., the external communication component 210 of FIG. 2) to enable communication between the mobile communication device and an external environment.

Figure 1:
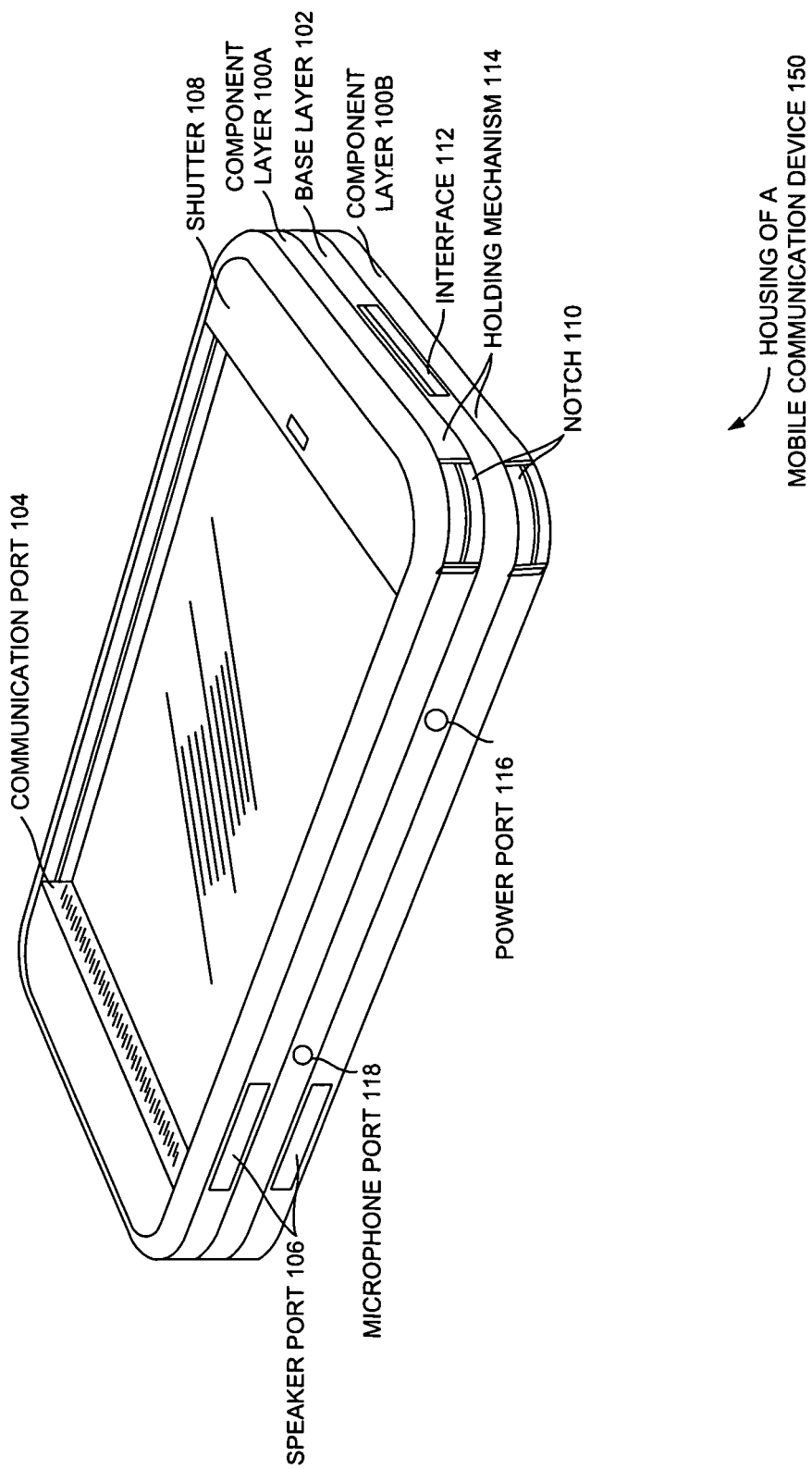
FIG. 1 is a schematic view illustrating a housing of a mobile communication device, according to one embodiment.

FIG. 1 is a schematic view illustrating a housing of a mobile communication device 150, according to one embodiment. Particularly, FIG. 1 illustrates a component layer 100A-B, a base layer 102, a communication port 104, a speaker port 106, a shutter 108, a notch 110, an interface 112, a holding mechanism 114, a power port 116, and a microphone port 118, according to one embodiment.

The component layer 100A-B may be a space that is designed to enable addition and removal of the modular peripheral component into the housing of the mobile communication device 150. The component layer 100A-B may expand the capabilities of the mobile communication device by enabling modularity of the peripheral components. The base layer 102 may be a main layer of the mobile communication device that has all the processing functionality to manage the mobile communication device including the modular peripheral components. The communication port 104 may enable the communication between the modular peripheral component and the processing component 208. The speaker port 106 may enable interfacing of a speaker device with the housing of the mobile communication device. The shutter 108 may be a masking mechanism that enables masking of empty space and certain component in the component layer 100A-B of the mobile communication device.

The notch 110 may be part of locking mechanism that enables the component layer 100A-B to lock and/or hold the modular peripheral device such that the modular peripheral devices do not come out of the housing while in a functional state. The interface 112 may be an option that enables the mobile communication device to communicate with other devices through interfacing for miscellaneous purposes such as data sharing, etc. The holding mechanism 114 may be a locking mechanism to hold the modular peripheral components in the component layer in place to avoid disconnection while functioning. The power port 116 may be an interface that enables the mobile communication device connection with external power sources. The microphone port 118 may be an interface that enables connection of a microphone with the mobile communication device.

In example embodiment, FIG. 1 illustrates a housing of the mobile communication device 150. The housing may have three basic layers to accommodate various components and peripherals associated to the mobile communication device. The base layer 102 may be the core of the mobile communication device which has the main processing components like a mobile mother board (MoMo), a processor, an external communication device, a power source, etc. The component layer 100A-B may form the rest of the housing which is communicatively coupled to the base layer 102. The component layer 100A-B may be an extension to the base layer 102. The component layer 100A-B may provide extended housing by enabling addition of the modular peripheral components based on the interest of a user. The housing may also provide wired interface to the external world through the interface 112 in the housing.

The housing may provide the holding mechanism 114 which may have notch 110 that enables opening and closing of the component layer 100A-B. The notch 110 of the holding mechanism 114 may be used to lock the holding mechanism 114 to the housing such that to prevent the disintegration of the modular peripheral component from the component layer 100A-B while the mobile communication device is functioning. The modular peripheral components may be inserted and/or removed through the inlet in the component layer 100A-B. The component layer 100A-B may also have speaker port 106 that enables an addition option to interface the speaker devices to the mobile communication device. The communication port 104 in the housing of the mobile communication device 150 may enable communication of the modular peripheral components with the processing component 208 in the base layer 102. The first modular peripheral component may use some lines of the communication port 104. The rest of communication lines may be used by the following modular peripheral components through the previous modular component by connecting daisy-chainable port. The housing of the mobile communication device 150 may enable configurability to choose a feature set. The housing of the mobile communication device 150 may illustrate expandability by enabling the possibility of adding more features to the existing configuration. The housing of the mobile communication device 150 may also enable upgradeability for the modular peripheral components.

In one embodiment, the component layer 100A-B may be coupled communicatively on either side of the base layer 102 to enable modification of the modular peripheral component integrated into the housing by sliding the modular peripheral component through a set of grooves 402 located on sides of each of the component layer 100A-B. The holding mechanism 114 in the component layer 100A-B may enable the modular peripheral component to remain in a fixed position.

The communication port 104 in the component layer 100A-B may enable the modular peripheral component to communicate with the base layer 102.

The shutter 108 may cover a remaining empty space and to mask the modular peripheral component in the component layer 100A-B. The component layer 100A-B may be designed as a First In Last Out (FILO) shelf structure to secure the modular peripheral component such that the modular peripheral component is integratable and securable in the FILO shelf structure. The holding mechanism 114 may lock the modular peripheral component and to integrate the modular peripheral component with the component layer 100A-B in the housing of the mobile communication device. The modular peripheral component may be enabled to communicate with the base layer 102 through the component layer 100A-B.

The shutter 108 may be designed to cover a remaining empty space between the modular peripheral component and the holding mechanism 114 at an end of the component layer 100A-B and to mask the modular peripheral component in the component layer 100A-B. The housing of the mobile communication device 150 may include the base layer 102 and the component layers 100A-B to enable expansion of capabilities of the mobile communication device by modification of the modular peripheral component. The communication port 104 in the mobile communication device may enable communication between the processor component of the mobile communication device and the modular peripheral component of the mobile communication device.

Figure 2:
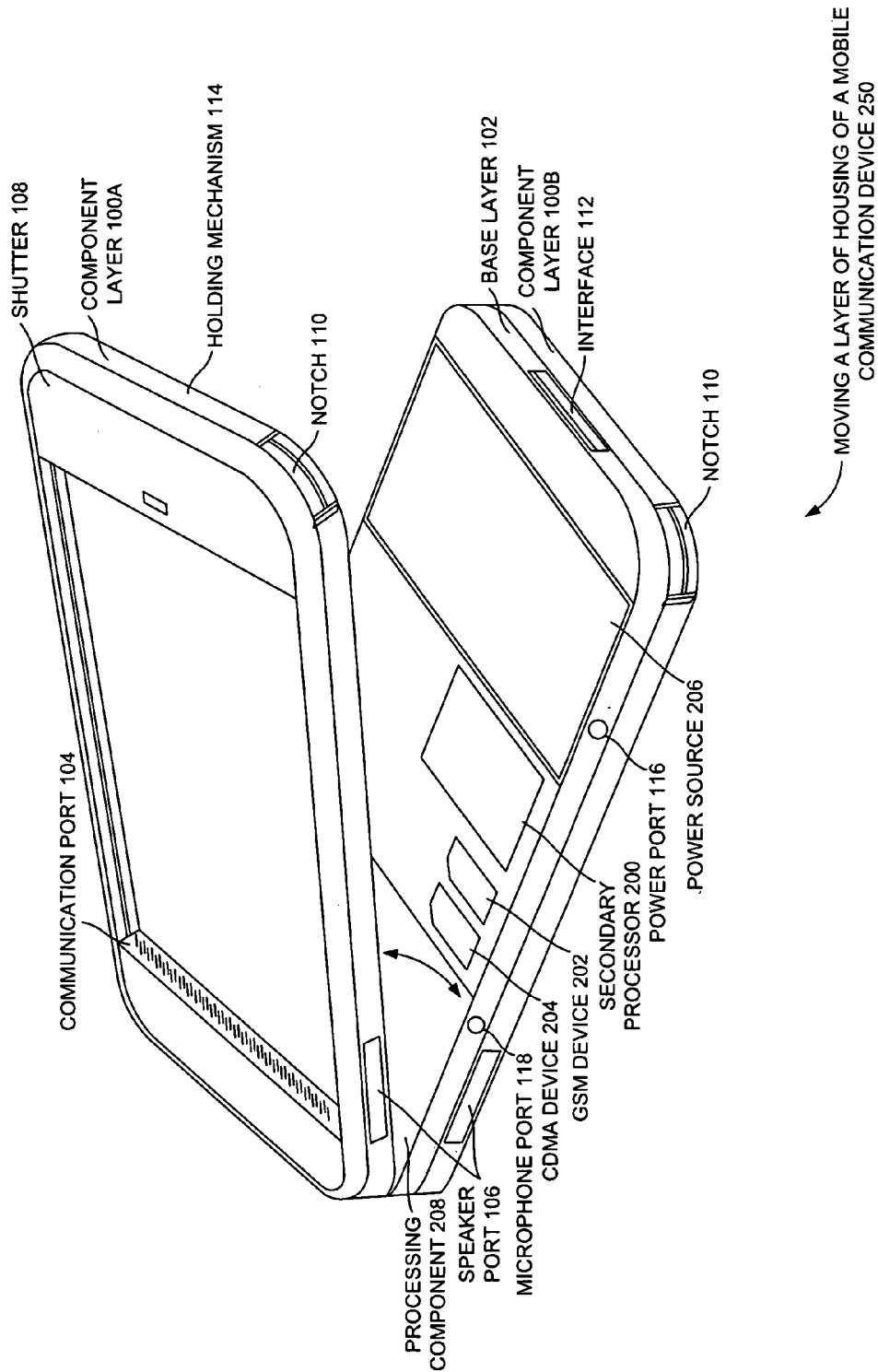
FIG. 2 is a schematic view illustrating a layer movement in the housing of the mobile communication device, according to one embodiment.

FIG. 2 is a schematic view illustrating a layer movement in the housing of the mobile communication device 250, according to one embodiment. Particularly, FIG. 2 illustrates a GSM device 202, a CDMA device 204, a power source 206, and a processing component 208, according to one embodiment.

The GSM device 202 may be an external communication module that may communicate with a GSM service provider (e.g., through the GSM network) to enable communication with the external environment. The CDMA device 204 may be an external communication module that may communicate with a CDMA service provider (e.g., through the CDMA network) to enable communication with the external environment. The power source 206 (e.g., a battery) may provide power supply to the mobile communication device. The processing component 208 may have necessary components that may be required to manage (e.g., process signals, interface, communicate, etc.) the mobile communication device and its modular peripheral components.

In example embodiment, FIG. 2 illustrates the movement of a component layer 100A in the housing of the mobile communication device. The component layers 100A-B may be rotated with centre of axis of rotation being the point of contact of the base layer 102 and the component layer 100A-B. The rotation of the component layer 100A with respect to the base layer 102 may enable exposure of the base layer 102 that may enable to add the certain modular peripheral component into the base layer 102.

Figure 3:
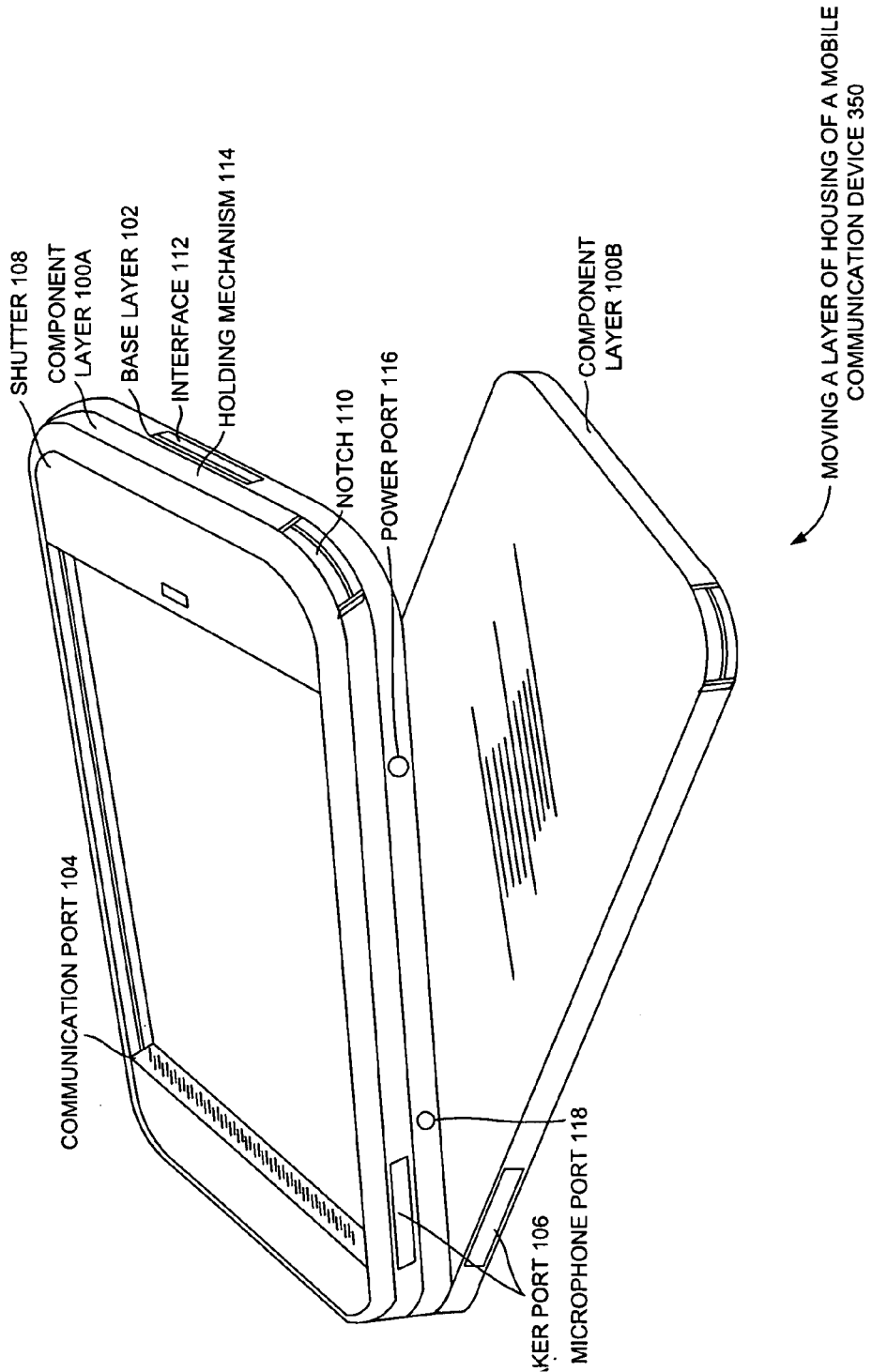
FIG. 3 is a schematic view illustrating another layer movement in the housing of the mobile communication device, according to one embodiment.

In one embodiment, the modular peripheral component may be a performance enhancing graphic processor component such as the secondary processor 200 performing graphics acceleration attachable in the base layer 102 that provides performance enhancement of the mobile communication device. The rotating mechanism (e.g., as illustrated in FIGS. 2 and 3) may be provided between the component layer 100A-B and the base layer 102 at one end of the housing such that the component layer 100A-B can be rotated in either directions with a center of axis being a fixed end of the base layer 102 and the component layer 100A-B enabling an addition of a enhancing modular peripheral component to be added to the base layer 102. The base layer 102 may have the power port 116 that enables charging of the mobile communication device from an external power source. The base layer 102 may also have the speaker port 106 and the microphone port 118.

The processing component 208 in the base layer 102 may detect the modification of the modular peripheral component and to process signals of the mobile communication device. The power source 206 in the base layer 102 of the mobile communication device may power the mobile communication device. The external communication component 210 may enable communication between the mobile communication device and an external environment.

FIG. 3 is a schematic view illustrating an other layer movement in the housing of the mobile communication device 350, according to one embodiment.

In example embodiment, FIG. 3 illustrates the movement of the base layer 102 and the component layer 100A with respect to the component layer 100B. The component layers 100A-B and the base layer 102 can all be rotated with respect to each other layer.

FIG. 4 is a schematic view illustrating different views of the housing of the mobile communication device 450, according to one embodiment. Particularly, FIG. 4 illustrates a groove 402, according to one embodiment.

In example embodiment, FIG. 4 illustrates different views of the housing of the mobile communication device. In particular, a front view 412, a back view 414, a side view 416, another side view 418, a top view 420, a bottom view 422 and a bottom view without a holding mechanism 424. The barcode reader may be accommodated on a top part of the housing of the mobile communication device as seen in the top view 420. The groove 402 may be seen in the bottom view 422 which enables the movement of the peripheral component layer.

In one embodiment, the movement layout in the groove 402 may be a designed space in the component layer 100A-B to enable movement of the modular peripheral component in the housing of the mobile communication device. The movement layout may be designed in the groove 402 of the component layer 100A-B to enable movement of the modular peripheral component in the housing of the mobile communication device 150.

Figure 5:
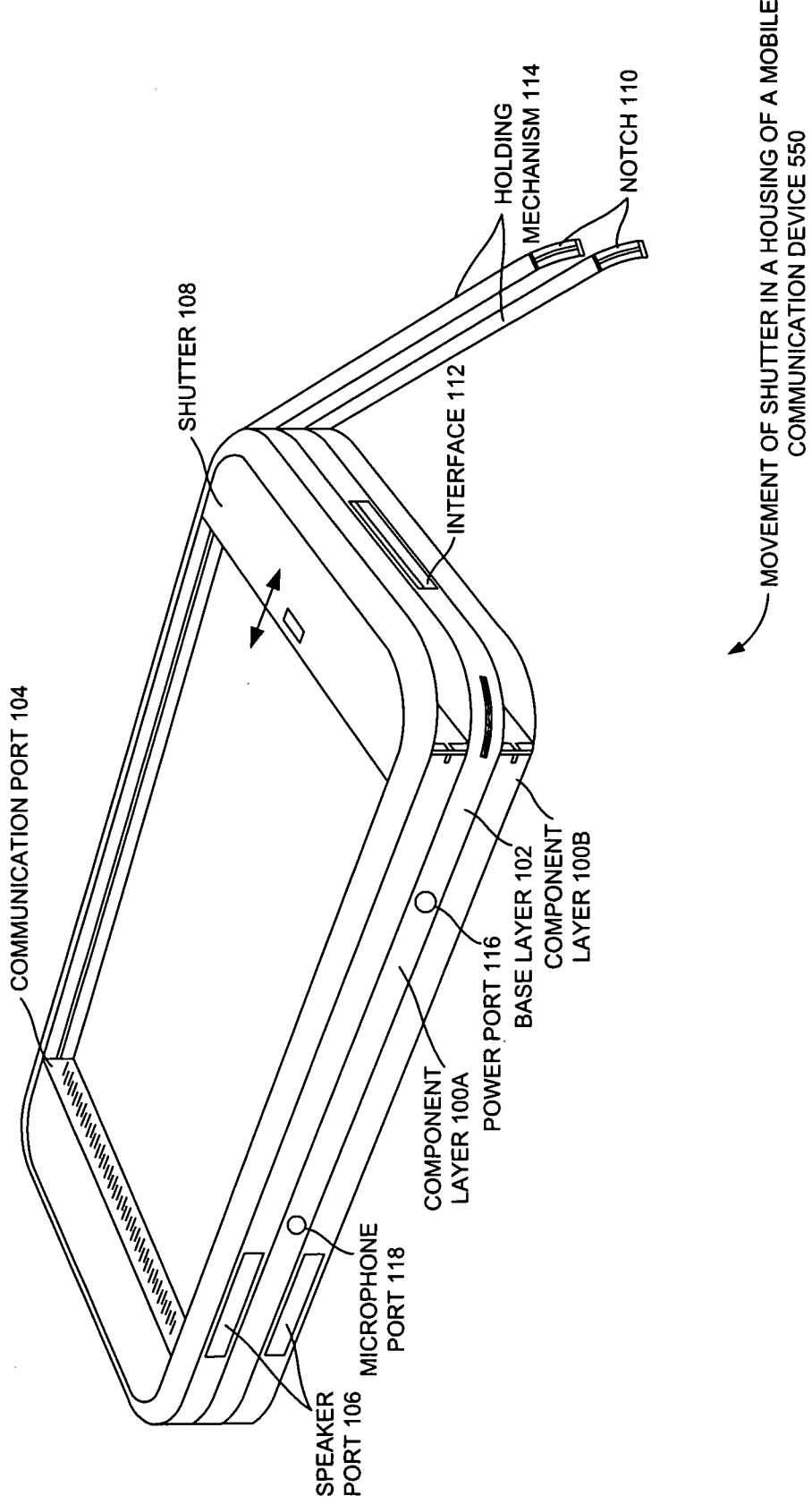
FIG. 5 is a schematic view illustrating a movement of a shutter in the housing of the mobile communication device, according to one embodiment.

FIG. 5 is a schematic view illustrating movement of the shutter 108 in the housing of the mobile communication device 550, according to one embodiment.

In example embodiment, FIG. 5 illustrates the movement of the shutter 108 in the housing of the mobile communication device. The shutter 108 in the housing of the mobile communication device may be provided to mask the open space in the component layer 100A-B. The shutter 108 may also be used to mask certain component in the component layer 100A-B. In addition it may act as a keypad protection or scratch proof for the display devices.

In one embodiment, the modification of the modular peripheral component integrated into the housing may be an addition of the modular peripheral component, removal of the modular peripheral component and/or enhancement of an existing modular peripheral component by replacing the existing modular peripheral component with an enhanced version of the modular peripheral component.

Figure 6A:
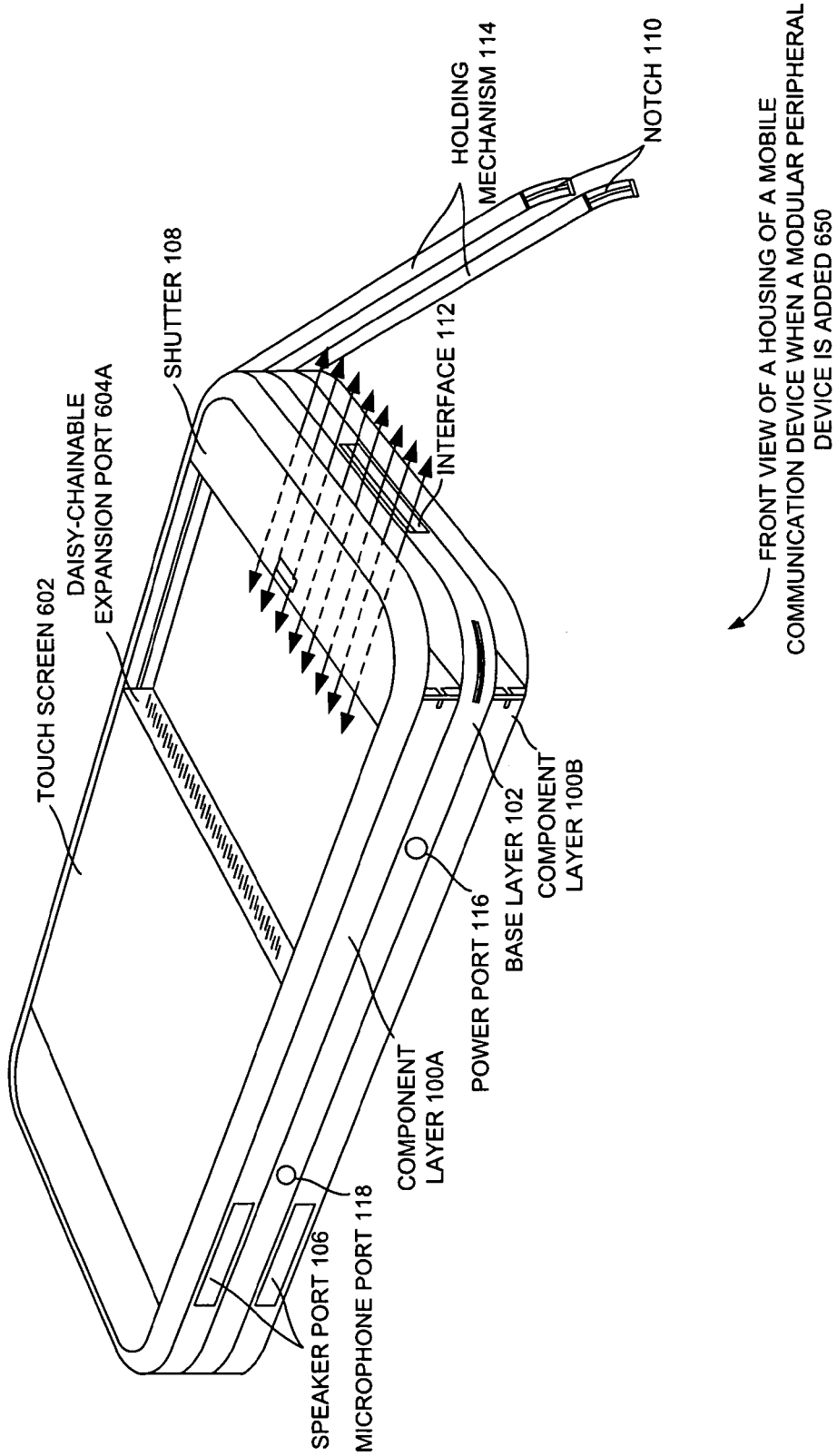
FIG. 6A illustrates a schematic representation of an angled front view of the housing of the mobile communication device with a modular peripheral component in the housing of the mobile communication device, according to another embodiment.

FIG. 6A illustrates a schematic representation of an angled front view of the housing of the mobile communication device with a modular peripheral component in the housing of the mobile communication device 650, according to another embodiment. Particularly, FIG. 6A illustrates a touch screen 602, and a daisy-chainable expansion port 604A, according to one embodiment.

The touch screen 602 may be an interactive visual display device the enables a user to interact with the computing device by touching the screen to select options from a displayed menu. The daisy-chainable expansion port 604A may be configuration that enables connection of the other modular peripheral devices in series such that the other modular peripheral components can communicate with the processing component 208. In an example embodiment, FIG. 6A illustrates a front view of the housing of the mobile communication device with the modular peripheral component being the touch screen 602. The holding mechanism 114 may be opened using the notch 110. The modular peripheral component may be inserted or removed from the component layer 100A through the groove 402.

Figure 6B:
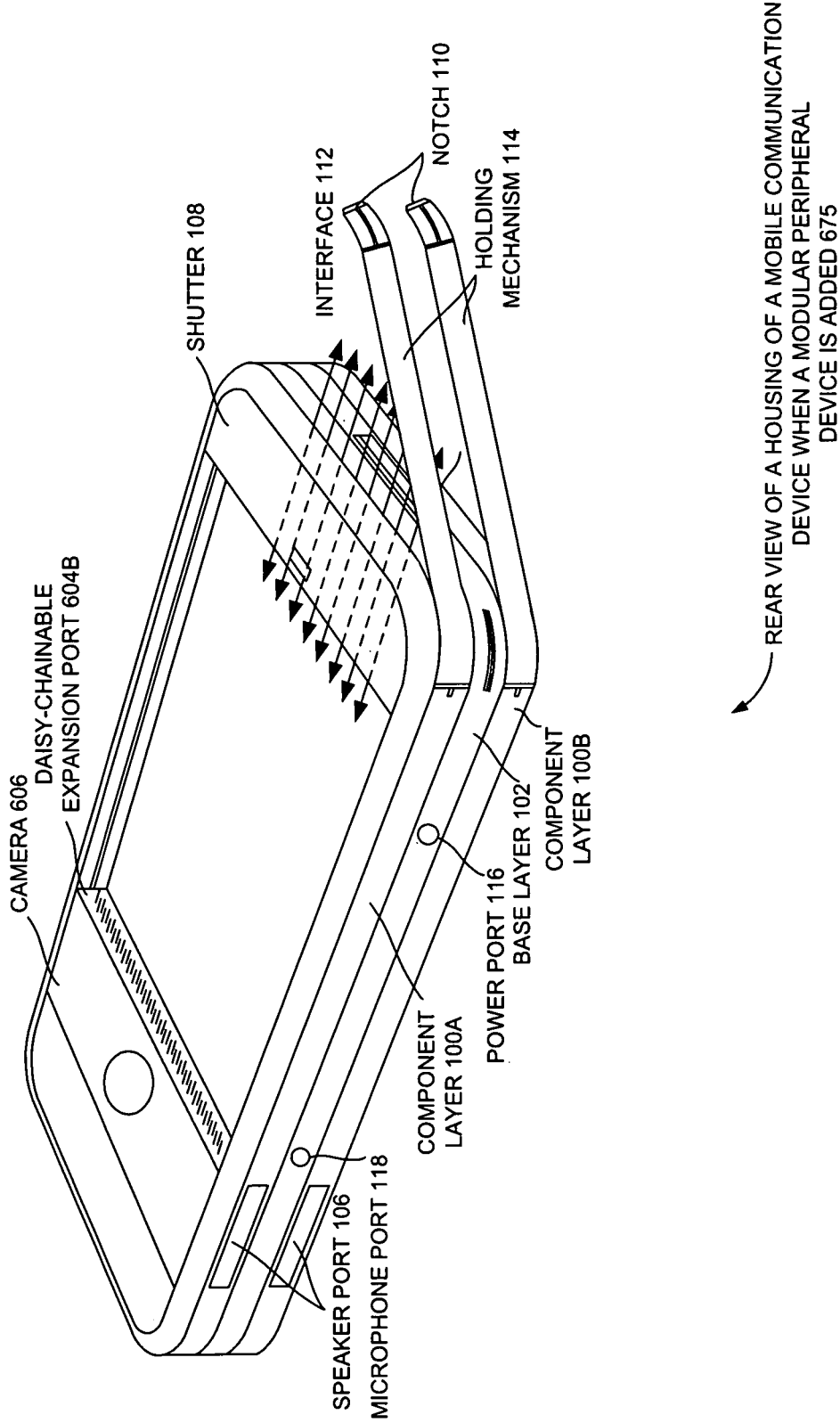
FIG. 6B illustrates a schematic representation of an angled rear view of the housing of the mobile communication device with another modular peripheral component in the housing of the mobile communication device, according to another embodiment.

FIG. 6B illustrates a schematic representation of an angled rear view of the housing of the mobile communication device with an other modular peripheral component in the housing of the mobile communication device 675, according to another embodiment. Particularly, FIG. 6B illustrates a daisy-chainable expansion port 604A, and a camera 606, according to one embodiment.

The camera 606 may be the modular peripheral component that may be used to capture still picture and motion videos with varying color depth and resolutions. In example embodiment, FIG. 6B illustrates a rear view of the housing of the mobile communication device illustrated in FIG. 6A. Since the component layers 100A-B are coupled on both the sides of the base layer 102, the modular peripheral components can be inserted or removed from both the component layers 100A-B.

In one embodiment, the modular peripheral component may include a daisy-chainable expansion port (e.g., the daisy-chainable expansion port 604A-B of FIG. 6A-B) that enables an additional modular peripheral component integratable in the mobile communication device to be communicatively coupled with the housing across a variety of physical connections of the daisy-chainable expansion port 604A-B.

Figure 7:
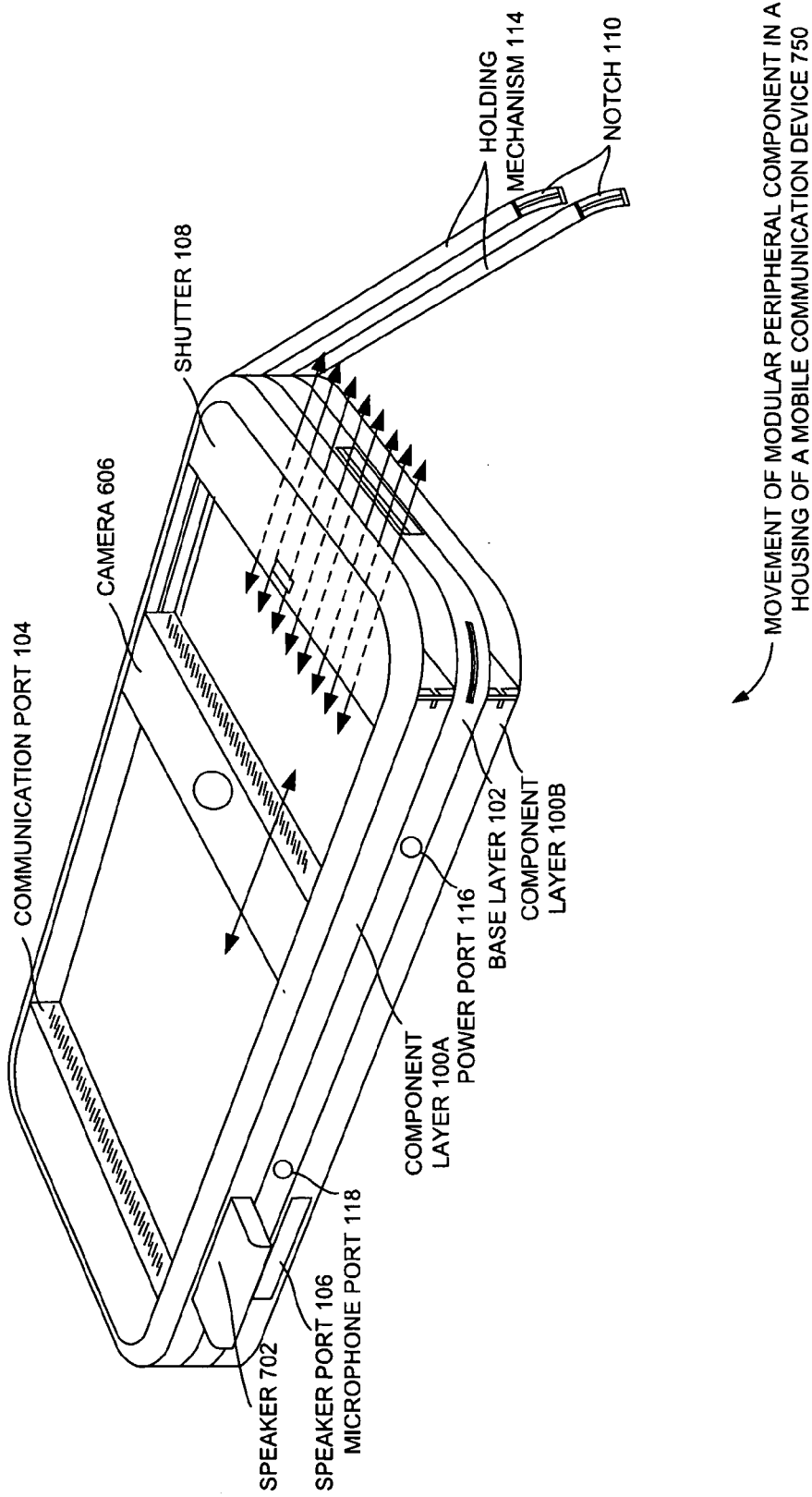
FIG. 7 is schematic view illustrating a movement of the modular peripheral component in the housing of the mobile communication device, according to one embodiment according to one embodiment.

FIG. 7 is schematic view illustrating a movement of the modular peripheral component in the housing of the mobile communication device 750, according to one embodiment. Particularly, FIG. 7 illustrates a speaker device 702, according to one embodiment.

The speaker device 702 may be an output device that may that generates volume at varying range for varying threshold distance. In example embodiment, FIG. 7 illustrates the movement of the modular peripheral component in the component layer 100A. Several modular peripheral components can be used in the housing of the mobile communication device. Every next modular peripheral component added to the component layer 100A-N will form a daisy-chain structure by interfacing with the other modular peripheral component.

FIG. 8 is table view illustrating a list of the modular peripheral components for the housing of the mobile communication device, according to one embodiment according to one embodiment. Particularly, FIG. 8 illustrates a display field 802, a camera field 804, a speaker field 806, and an other field 808, according to one embodiment.

In example embodiment, the table view 850 illustrates various modular peripheral components that can be used in the housing of the mobile communication device.

In one embodiment, the modular peripheral component may be an input device such as an interchangeable set of cameras that offer capture of still and motion video across a variety of resolution types. The modular peripheral component may be an interchangeable touch screen to function as an interface between a processor of the mobile communication device and an external environment by displaying information at varying resolution and color depths and performing a function of a pointing device such a single click function, a double click function and a drag and drop function. The modular peripheral component may be an interchangeable speaker that generates a range of volume for an audio signal with different audible effect to be heard at different threshold distances.

The modular peripheral component may a keypad that serves as an interface between the mobile communication device and an external environment so as to configure and manage the mobile communication device. The modular peripheral component may also be an input device such as a barcode reader, a communication device such as a Bluetooth device, a GSM device, a CDMA device, a GPS device and an Infrared device, an output device such a display device, and a processing device such as secondary processor for graphic acceleration.

Figure 9:
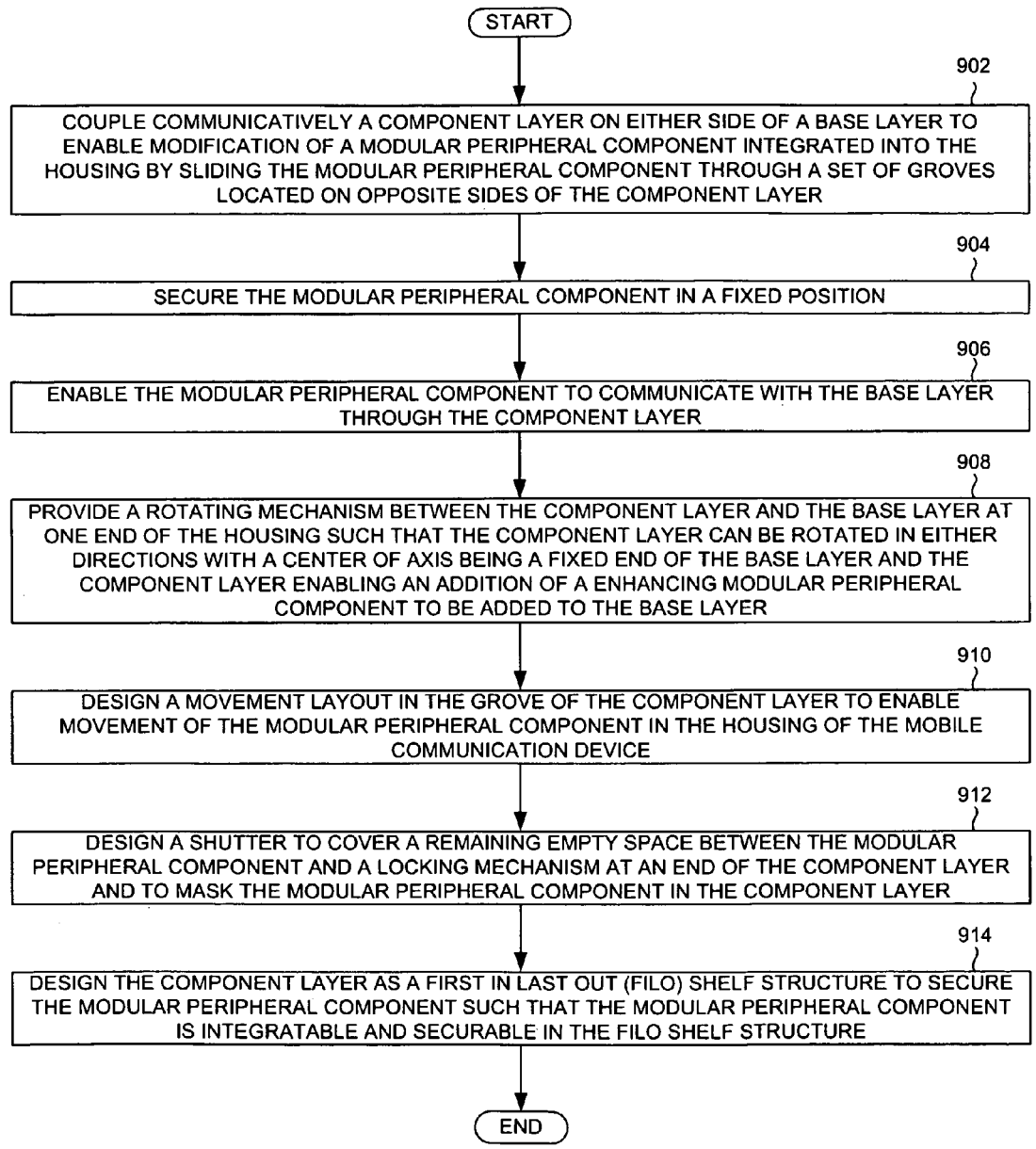
FIG. 9 is a process flow of illustrating an integration of an expandable housing of the mobile communication device, according to one embodiment.

FIG. 9 is a process flow of illustrating a integration of an expandable housing of the mobile communication device, according to one embodiment. In operation 902, a component layer (e.g., the component layer 100A-B of FIG. 1) may be communicatively coupled on either side of a base layer (e.g., the base layer 102 of FIG. 1) to enable modification of a modular peripheral component (e.g., any of the modular peripheral component illustrated in FIG. 8) integrated into the housing by sliding the modular peripheral component through a set of grooves (e.g., the grooves 402 as illustrated in FIG. 4) located on opposite sides of the component layer 100A-B.

In operation 904, the modular peripheral component may be secured in a fixed position. The modular peripheral component may include a daisy-chainable expansion port that enables an additional modular peripheral component integratable in the mobile communication device to be communicatively coupled with the housing across a variety of physical connections of the daisy-chainable expansion port. In operation 906, the modular peripheral component may be enabled to communicate with the base layer 102 through the component layer 100A-B. In operation 908, a rotating mechanism may be provided between the component layer 100A-B and the base layer 102 at one end of the housing such that the component layer 100A-B can be rotated in either directions with a center of axis being a fixed end of the base layer 102 and the component layer 100A-B enabling an addition of a enhancing modular peripheral component to be added to the base layer 102.

In operation 910, a movement layout may be designed in the groove 402 of the component layer 100A-B to enable movement of the modular peripheral component in the housing of the mobile communication device 150. In operation 912, a shutter (e.g., the shutter 108 of FIG. 1) may be designed to cover a remaining empty space between the modular peripheral component and a holding mechanism (e.g., the holding mechanism 114 of FIG. 1) at an end of the component layer 100A-B and to mask the modular peripheral component in the component layer 100A-B. In operation 914, the component layer 100A-B may be designed as a First In Last Out (FILO) shelf structure to secure the modular peripheral component such that the modular peripheral component is integratable and securable in the FILO shelf structure. The modification of the modular peripheral component integrated into the housing may be an addition of the modular peripheral component, removal of the modular peripheral component and/or enhancement of an existing modular peripheral component by replacing the existing modular peripheral component with an enhanced version of a modular peripheral component.

The modular peripheral component may be an input device such as an interchangeable set of cameras that offer capture of still and motion video across a variety of resolution types. The modular peripheral component may be an input/output device such as an interchangeable touch screen to function as an interface between a processor of the mobile communication device and an external environment by displaying information at varying resolution and color depths and performing a function of a pointing device such a single click function, a double click function and/or a drag and drop function. The modular peripheral component may be an output device such as an interchangeable speaker that generates a range of volume for an audio signal with different audible effect to be heard at different threshold distances.

The modular peripheral component may be a controlling device such as a keypad that serves as an interface between the mobile communication device and an external environment so as to configure and manage the mobile communication device. The modular peripheral component may be a performance enhancing modular peripheral component such as a secondary processor (e.g., the secondary processor 200 of FIG. 2) performing graphics acceleration attachable in the base layer 102 that provides performance enhancement of the mobile communication device.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structures and methods may be embodied using transistors, logic gates, and electrical circuits (e.g., Application Specific Integrated (ASIC) Circuitry and/or in Digital Signal Processor (DSP) circuitry).

Particularly, the component layer 100A-B, the base layer 102, the communication port 104, the speaker port 106, the shutter 108, an interface 112, the power port 116, and the microphone port 118, the GSM device 202, the CDMA device 204, the processing component 208, the touch screen 602, and the daisy-chainable expansion port 604A, the camera 606, the speaker device 702, etc. of FIG. 1-9, and the other modules may be enabled using software and/or using transistors, logic gates, and electrical circuits (e.g., application specific integrated ASIC circuitry) such as a component layer circuit, a base layer circuit, a communication port circuit, a speaker port circuit, a shutter circuit, an interface circuit, a power port circuit, and a microphone port circuit, a GSM device circuitry, a CDMA device circuitry, a processing layer circuitry, a GPS circuitry, a touch screen circuitry, and a daisy-chainable expansion port circuit, a camera circuitry, a speaker device circuitry and other circuits.

In addition, it will be appreciated that the various operations, processes, and methods disclosed herein may be embodied in a machine-readable medium and or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A housing of a mobile communication device comprising:
   a substantially planar base layer including provision to accommodate control circuitry associated with functioning of the mobile communication device;
   at least one component layer coupled communicatively on at least one of two substantially planar sides of the base layer to enable modification of a modular peripheral component integrated into the housing by sliding an entire length of the modular peripheral component therethrough;
   and a holding mechanism in the at least one component layer that enables the modular peripheral component to remain in a fixed position within the at least one component layer, the holding mechanism being secured to the at least one component layer at one of two bookends of a lateral dimension thereof perpendicular to a length thereof, the holding mechanism being a locking mechanism including a notch configured to latch onto an appropriate complementary receptor provided at the other of the two bookends when appropriately pressed such that a lateral dimension of the modular peripheral component inserted into the housing is completely covered by the holding mechanism in a secure state thereof, and the holding mechanism being leveled with a lateral dimensional surface of the mobile communication device in the secure state thereof,
   wherein the base layer also includes a provision to accommodate a modular peripheral component on the at least one of the two substantially planar sides thereof and to modify the modular peripheral component,
   wherein the at least one component layer is designed as a First In Last Out (FILO) shelf structure to secure the modular peripheral component such that the modular peripheral component is integratable and securable in the FILO shelf structure,
   wherein the modular peripheral component includes a daisy-chainable expansion port that enables an additional modular peripheral component integratable in the mobile communication device to be communicatively coupled with the housing, and
   wherein the at least one component layer further comprises a communication port on at least one of two substantially planar sides thereof to enable communication between the control circuitry and the modular peripheral component associated with both the base layer and the at least one component layer, and detection of the modification of the modular peripheral component through the control circuitry.

2. The housing of the mobile communication device of claim 1, further comprising a rotating mechanism between the at least one component layer and the base layer at one end of the housing such that the at least one component layer can be rotated in either direction with a center of axis being a fixed end of the base layer and the at least one component layer to enable the modification of the modular peripheral component associated with the base layer.

3. The housing of the mobile communication device of claim 1, further comprising:
   a shutter to cover an empty space and to mask the modular peripheral component in the at least one component layer.

4. The housing of the mobile communication device of claim 1, wherein the holding mechanism is configured to lock the modular peripheral component and to integrate the modular peripheral component with the at least one component layer in the housing of the mobile communication device.

5. The housing of the mobile communication device of claim 1, wherein the modification of the modular peripheral component integrated into the housing is at least one of an addition of the modular peripheral component, removal of the modular peripheral component, and enhancement of an existing modular peripheral component by replacing the existing modular peripheral component with an enhanced version of the modular peripheral component.

6. The housing of the mobile communication device of claim 1, wherein the modular peripheral component is a camera.

7. The housing of the mobile communication device of claim 1, wherein the modular peripheral component is a touch screen.

8. The housing of the mobile communication device of claim 1, wherein the modular peripheral component is a speaker.

9. The housing of the mobile communication device of claim 1, wherein the modular peripheral component is a keypad.

10. The housing of the mobile communication device of claim 1, wherein the modular peripheral component is a performance enhancing graphics processor.

11. A method of integrating an expandable housing of a mobile communication device comprising:
communicatively coupling at least one component layer on at least one of two substantially planar sides of a base layer to enable modification of a modular peripheral component integrated into the housing by sliding an entire length of the modular peripheral component therethrough, the base layer including provision to accommodate control circuitry associated with functioning of the mobile communication device;
providing, also in the base layer, a capability to accommodate a modular peripheral component on the at least one of the two substantially planar sides thereof and to modify the modular peripheral component;
enabling securing of the modular peripheral component in a fixed position within the at least one component layer through a holding mechanism based on the holding mechanism being secured to the at least one component layer at one of two bookends of a lateral dimension thereof perpendicular to a length thereof, the holding mechanism being a locking mechanism including a notch configured to latch onto an appropriate complementary receptor provided at the other of the two bookends when appropriately pressed such that a lateral dimension of the modular peripheral component inserted into the housing is completely covered by the holding mechanism in a secure state thereof, and the holding mechanism being leveled with a lateral dimensional surface of the mobile communication device in the secure state thereof;
enabling the modular peripheral component associated with both the at least one component layer and the base layer to communicate with the control circuitry in the base layer through a communication port on the at least one component layer; and
designing the at least one component layer as a FILO shelf structure to secure the modular peripheral component such that the modular peripheral component is integratable and securable in the FILO shelf structure, wherein the modular peripheral component includes a daisy-chainable expansion port that enables an additional modular peripheral component integratable in the mobile communication device to be communicatively coupled with the housing.

12. The method of claim 11, further comprising:
providing a rotating mechanism between the at least one component layer and the base layer at one end of the housing such that the at least one component layer can be rotated in either directions with a center of axis being a fixed end of the base layer and the at least one component layer to enable the modification of the modular peripheral component associated with the base layer.

13. The method of claim 11, wherein the modification of the modular peripheral component integrated into the housing is at least one of an addition of the modular peripheral component, removal of the modular peripheral component, and enhancement of an existing modular peripheral component by replacing the existing modular peripheral component with an enhanced version of the modular peripheral component.

14. The method of claim 11, wherein the modular peripheral component is one of:
a camera;
a touch screen;
a speaker;
and a performance enhancing graphics processor.

15. A mobile communication device comprising:
a housing including a substantially planar base layer and at least one component layer to enable expansion of capabilities of the mobile communication device by modification of a modular peripheral component through sliding an entire length of the modular peripheral component through the at least one component layer, the at least one component layer being communicatively coupled on at least one of two substantially parallel sides of the base layer, the housing further comprising a holding mechanism in the at least one component layer to enable the modular peripheral component to remain in a fixed position therein, the holding mechanism being secured to the at least one component layer at one of two bookends of a lateral dimension thereof perpendicular to a length thereof, the holding mechanism being a locking mechanism including a notch configured to latch onto an appropriate complementary receptor provided at the other of the two bookends when appropriately pressed such that a lateral dimension of the modular peripheral component inserted into the housing is completely covered by the holding mechanism in a secure state thereof, the holding mechanism being leveled with a lateral dimensional surface of the mobile communication device in the secure state thereof, and the base layer also including a provision to accommodate a modular peripheral component on the at least one of the two substantially planar sides thereof and to modify the modular peripheral component, wherein the at least one component layer is designed as a First In Last Out (FILO) shelf structure to secure the modular peripheral component such that the modular peripheral component is integratable and securable in the FILO shelf structure, wherein the modular peripheral component includes a daisy-chainable expansion port that enables an additional modular peripheral component integratable in the mobile communication device to be communicatively coupled with the housing;
a processing component in the base layer associated with functioning of the mobile communication device to detect the modification of the modular peripheral component and to process signals of the mobile communication device; and a communication port on at least one of two substantially parallel sides of the at least one component layer to enable communication between the processing component and the modular peripheral component associated with both the base layer and the at least one component layer.

16. The mobile communication device of claim 15, wherein the modification of the modular peripheral component integrated into the housing is at least one of an addition of the modular peripheral component, removal of the modular peripheral component, and enhancement of an existing modular peripheral component by replacing the existing modular peripheral component with an enhanced version of the modular peripheral component.

17. The mobile communication device of claim 15, wherein the modular peripheral component is one of an input device that is one of a camera, a keypad, and a barcode reader, a communication device that is one of a Bluetooth™ device, a GSM device, a CDMA device, a GPS device, and an Infrared device, an output device that is one of a speaker and a display device, and a secondary processor for graphics acceleration.

* * * * *